United States Patent [19]
Buchanan et al.

[11] Patent Number: 5,122,671
[45] Date of Patent: Jun. 16, 1992

[54] TERBIUM ACTIVATED SILICATE LUMINESCENT GLASSES FOR USE IN CONVERTING X-RAY RADIATION INTO VISIBLE RADIATION

[75] Inventors: Robert A. Buchanan, Palo Alto; Clifford Bueno, Sunnyvale, both of Calif.

[73] Assignee: Lockheed Missiles & Space Company, Inc., Sunnyvale, Calif.

[21] Appl. No.: 719,446

[22] Filed: Jun. 24, 1991

Related U.S. Application Data

[62] Division of Ser. No. 398,873, Aug. 28, 1989, abandoned.

[51] Int. Cl.$^5$ ............................................. C09K 11/79
[52] U.S. Cl. .......................... 250/483.1; 250/363.01; 252/301.4 F; 501/64
[58] Field of Search ................ 252/301.4 F; 250/362, 250/363.01, 483.1; 501/64

[56] References Cited

U.S. PATENT DOCUMENTS

| | | | |
|---|---|---|---|
| 3,654,172 | 4/1972 | Reade | 252/301.4 F |
| 4,798,681 | 1/1989 | Oversluizen et al. | 252/301.4 F |
| 4,928,017 | 5/1990 | Kemmler-Sack et al. | 252/301.4 F |

*Primary Examiner*—Jack Cooper
*Attorney, Agent, or Firm*—Richard H. Bryer

[57] ABSTRACT

This invention relates to terbium activated silicate luminescent glasses exhibiting reduced afterglow and enhanced luminescence due to incorporation therein of selected rare earth oxides of cerium, europium and godolinium.

4 Claims, No Drawings

TERBIUM ACTIVATED SILICATE LUMINESCENT GLASSES FOR USE IN CONVERTING X-RAY RADIATION INTO VISIBLE RADIATION

This application is a division of Ser. No. 398,873 filed on Aug. 28, 1989, now abandoned

TECHNICAL FIELD

This invention relates to terbium activated silicate luminescent glasses exhibiting reduced afterglow and an enhanced luminescence responsivity under x-rays in the range of from about 5 keV to about 16 MeV.

BACKGROUND ART

Luminescent glasses that are transmissive to light from the near ultraviolet (200–300 nm) to the near infrared (3000 nm) and that can be formed into clear glass plates and fibers (See R. F. Reade, U.S. Pat. No. 3,654,172), lenses (See T. Takahashi, et al, U.S. Pat. No. 4,259,587), or ground glass are used to detect various forms of electromagnetic, electron beam, particle beam or nuclear radiation by luminescing under the proper excitation conditions. The threshold for luminescence in glass as in other inorganic luminescent materials is typically above an excitation energy of approximately 2.5 eV (See for example Blasse, G. and Bril, A. "Characteristic Luminescence," *Philips Technical Review*, Vol. 31, No. 10, 304, 1970).

A method for using luminescent glass is to view the emission in real-time employing a video camera. Important characteristics of the glass in this mode include high absorption of the excitation radiation, high luminescence responsivity, prompt emission, low afterglow, and a linear response over a wide range of excitation intensity. The luminescent glass shall also emit light within the wavelength sensitivity range of the recording camera and shall maintain the spatial resolution of the primary image. Particular applications for the glass in this mode include detecting x-rays, or gamma rays for the purpose of diagnostic medical or industrial imaging (See for example Bossi, R. H., Oien, C. T., "Real-Time Radiography" RPT #DE82-005603, UCRL-53091, LLNL, CA) or for tracking high energy particles (See for example, Ruchti, R. et al, "Scintillating Glass, Fiber Optic Plate Imaging System for Tracking Applications in High Energy Physics Experiments", *J. Luminescence* Vol. 31–32, Part 1 and 2, Dec. 1984, Proceedings of the 1984 International Conference on Luminescence, Madison, WI, USA, Aug. 13–17, 1984 p. 721–723).

Luminescent glasses are of particular interest in real-time x-ray radiography. Traditionally, in real-time x-ray radiography, a visible image is generated by polycrystalline x-ray-to-light conversion screen that is monitored by a low light level TV camera. A similar screen can also be employed in an x-ray image amplifier tube where the visible image generated by the phosphor is further electro-optically intensified prior to collection by a TV camera. This screen is typically composed of polycrystalline x-ray phosphor particles embedded in a binder, and both are supported on a thin mylar sheet as taught by Buchanan, R. A. et al. U.S. Pat. No. 3,725,704. Although many commercial polycrystalline phosphor screens have a strong luminescene signal under x-rays (as illustrated by Buchanan, R. A., et al in U.S. Pat. No. 4,297,584), the image resolution is limited by the light scatter among individual phosphor particles in the screen and the image contrast can be limited by their relatively low x-ray absorption efficiencies. Furthermore, light scatter in thicker, more absorbing screens will trap the light embedded in the sublayers of the screen to result in a reduced light signal and therefore a reduced contrast perceptibility. The binder in the screen, which can be present in as much as 50 percent by weight has the added disadvantages of being inert and provides no means for transferring energy absorbed within to luminescent centers in the crystalline phosphor particles. These same problems exist when these phosphor screens are used as film intensifier screens in radiographic film cassettes.

Luminescent glass plates and fiber optic scintillating plates offer solutions to the problems imposed by polycrystalline phosphor screens. Such glass plates do not degrade resolution by transverse light scattering within the glass. Secondly, increased x-ray absorption and improved noise statistics can be realized by the use of thicker ($\frac{1}{4}$") glass plates where light from the entire cross section of the plate can reach the recording medium without being trapped. Thirdly, no binder is required, the theoretically all the x-ray energy absorbed can be transferred to the luminescent centers in the glass. Finally, luminescent glass plates are more resistant to environmental attack, for example, scratches, chemical reaction, and abrasion.

The advantage of using thick glass plates is particularly important for industrial radiography where high energy x-rays (100 kev–15 mev) are used and where the thick glass plates will absorb and convert a higher portion of the photon flux than the more x-ray transparent thin polycrystalline phosphor screens. Illustrative uses for high energy luminescent glasses include a stand alone luminescent glass plate viewed by a low level TV camera forming a real time radiographic system, a fiber-optic scintillating plate incorporated in an x-ray image amplifying fluoroscopy tube, and as a fiber optic scintillating plate for intensification of film in a radiographic film cassette.

Although luminescent glass detection screens have shown promise for x-ray radiographic applications (U.S. Pat. No. 3,654,172), they haven't been widely used because of phosphorescence problems including signal instability (i.e., background buildup) and low-luminescence responsivity. Those that have been used are activated with terbium oxide, but suffer from these drawbacks.

The effects of phosphorescence and background buildup are believed to be caused by radiation produced free electrons and holes that are trapped in defect centers in the glass structure. Such defect centers can consist of vacancies, interstitial atoms or other types of charge imbalance. Over time, these trapped carriers are released by thermal and electromagnetic (i.e., x-rays) stimulation, and radiatively recombine at luminescence centers to result in phosphorescence. In real-time systems, the buildup of the background is a result of the gradual filling of traps. With increasing illumination, intensity or duration, deeper and deeper traps become filled, and eventually emptied and hence the long decay component is increased and the background level increases. If the background levels are significant, this could lead to increased noise and image lag. The problem becomes apparent in making observations of very weak signals following very strong signals. This problem is not limited to luminescent glasses but has also arisen with some polycrystalline phosphor materials in real time imaging systems (See for example Torr, M. R.

"Persistence of Phosphor Glow in Microchannel Plate Image Intensifiers," *Applied Optics*, Vol. 24, No. 6, 793, 1985).

Commercially available terbium activated silicate luminescent glasses, including those developed under U.S. Pat. No. 3,654,172, have a strong phosphorescence after only moderate exposures to x-rays. Applicants have found that this phosphorescence is manifested as a signal increase of as much as 130% after 3000 R and 180% after 25,000 R of its initial value under continuous illumination at 250 kVp.

Other commercially available terbium activated silicate luminescent glasses demonstrate similar, if not more pronounced buildup behavior under similar x-ray conditions. The applicants are unaware of any commercial terbium activated x-ray luminescent silicate glasses that do not have this problem. The problem is common to any prior silicon oxide glass that contains terbium activation. For example, terbium activated fused silicon oxide glass demonstrates a severe phosphorescence and signal buildup under moderate x-ray exposures.

The prior art does not give any guidance for reducing phosphorescence in these materials while retaining or improving luminescence responsivity under x-rays.

Another aspect limiting the use of existing luminescent glasses for the application of x-ray imaging is their low luminescence efficiency (gram for gram) compared to polycrystalline phosphor materials. The known prior art host materials allow only a low level of terbium activation before the onset of concentration quenching (where increased levels of activator do not increase light output and can reduce responsivity by increasing the probability of trapping in the glass). There exists a need for new host materials permitting increased levels of terbium oxide before the onset of concentration quenching with a resulting improvement in light output.

DISCLOSURE OF INVENTION

Briefly, in accordance with the invention, selected rare earth oxides are incorporated into terbium activated silicate luminescent glasses, including the compositions of U.S. Pat. No. 3,654,172, to reduce phosphorescence and background buildup and enhance luminescent responsivity under x-ray illumination energy between about 5 keV and 16 MeV.

More particularly, in one embodiment of the invention, the silicate glasses contain, by weight on the oxide basis, about 0.1 to 2 percent of at least one oxide selected from the group consisting of cerium oxide and europium oxide, and 0.75 to 10 percent terbium oxide. A preferred cerium oxide and europium oxide range is 0.1 to 1 percent and a preferred terbium oxide range is 0.75 to 7 percent.

In another embodiment of the invention, the silicate glasses also contain from about 1 to 15 percent $Gd_2O_3$, preferably 1 to 10 percent, and 5 to 20 percent $Tb_2O_3$, preferably 6 to 10 percent.

BEST MODE OF CARRYING OUT THE INVENTION

Applicants have found that cerium oxide additions or europium oxide additions to terbium activated radioluminescent glasses including those listed in U.S. Pat. No. 3,654,172 result in reduced afterglow and background buildup in those materials under x-ray excitation in the range from 5 keV to 16 MeV. The applicants have found further that by incorporating gadolinium oxide and the appropriate amount of terbium oxide to such glasses the luminescent responsivity can be improved within the same energy regime. The applicants have found further that by combining the addition of appropriate amounts of cerium or europium oxide with the appropriate amounts of gadolinium and terbium oxide that the luminescence responsivity and afterglow characteristics can be improved under x-rays of energy in this regime over prior art thus providing a unique high resolution scintillating detection screen that can be used for such applications as x-ray real time radiography.

As previously discussed, an increase in background levels due to increased phosphorescence under continuous x-ray illumination is due to increased trapping/detrapping mechanisms. This effect can be monitored as a function of increasing accumulated dose by simultaneously measuring the glass light output and the accumulated dose to the glass under continuous x-ray illumination.

The samples are x-ray illuminated at a 6 inch target-to-screen distance. The x-ray energy range studied was between 250 kVp and 350 kVp. A photometer is used to detect the resulting luminescence and to monitor the buildup. Corrections are applied for ambient light in the darkened room and background x-ray signals on the photometer. X-ray absorption corrections were also applied to the buildup of each glass. An electronic dosimeter probe is placed next to the sample and the accumulated dose is recorded. Luminescence and dose measurements are taken at 1 minute intervals.

Relative luminescence responsivity measurements were taken in a similar manner to that described above but the x-ray conditions were chosen such that the signal buildup was small. For these measurements, all glasses were preheated to 400° C. to release trapped carriers and to bleach any x-ray induced coloration prevalent in the samples from prior experiments. Glass buttons of approximately equal thickness were measured.

The oxides of cerium and europium can be added into silicate luminescent glasses including those disclosed in U.S. Pat. No. 3,654,172 by admixing one of the following: $Ce_2O_3(Ce^{3+})$, $CeO_2(Ce^{4+})$, $Eu_2O_3(Eu^{3+})$, $EuO(Eu^{2+})$ or any other batch component that is transformed during glass formation into the desired mixed valence metal oxides in proper proportions. We have observed that addition of either oxidation state of the respective metal oxides results in a similar reduced background level for the glass composition under continuous x-ray illumination (and a reduced afterglow after x-ray illumination). This indicates that both oxidation states may be prevalent after the glass is formed. It appears likely that both states are required to interact with the x-ray generated electrons and holes and to transfer this energy to terbium to reduce trapping, background buildup and phosphorescence.

The mixed valence rare earth ions are selectively trapping charge that would normally be trapped at other locations in the glass. The advantage of using the rare earth ions is that they offer pathways to transfer this energy to the terbium ions. This process is structure independent since the rare earth ions are evenly distributed throughout the glass and the transfer processes are unaffected by glass modifier ions. For example, different or no glass modifier ions have little affect on the interaction between the rare earth ions that results in reduced phosphorescence. It should be noted that the phosphorescence is reduced in any terbium activated silicate luminescent glass with terbium oxide ($Tb_2O_3$)

levels ranging from about 0.75 weight percent to about 10 weight percent and higher when the proper amounts of cerium oxide or europium oxide are incorporated into the glass.

As was previously mentioned, REO wherein REO is at least one component selected from the group $Ce_2O_3/CeO_2$ and $EuO/Eu_2O_3$ in the range from 0.1 to 2.0 percent by weight can be added to terbium activated luminescent glasses including those claimed in U.S. Pat. No. 3,654,172 for the purpose of reducing signal buildup and afterglow under x-ray illumination in the 5 keV to 16 MeV range. Amounts present below about 0.1 percent have not shown to have any meaningful effect on afterglow. Concentrations higher than 2 percent give rise to a deleterious coloration of the glass evidently due to strong concentration dependent absorption transitions associated with these ions.

Applicants have found that gadolinium oxide additions to luminescent glasses such as those of U.S. Pat. No. 3,654,172 allow for larger additions of $Tb_2O_3$ before the onset of concentration quenching such that glasses can be produced with an improved luminescence responsivity under x-ray illumination.

$Gd_2O_3$ additions in the range of about 1.0 to about 15 weight percent to terbium activated silicate luminescent glasses, and particularly those of U.S. Pat. No. (3,654,172 where $Tb_2O_3$ is present will allow a $Tb_2O_3$ level in an amount of from about 5 to about 20 weight percent and will assure an improved luminescence response in these glasses under x-ray illumination in the 5 keV to 16 MeV range. Compositions containing below 5% $Tb_2O_3$ have shown no improvement in responsivity over the prior art for any amount of $Gd_2O_3$. Compositions above 20 percent $Tb_2O_3$ undergo severe concentration quenching, resulting in no improvement over prior art. Similar findings are associated with $Gd_2O_3$ concentrations below one percent and above 15 percent.

In another embodiment of the invention, the silicate glasses consist essentially, by weight on the oxide basis, of about 3-25% $R_2O$, wherein $R_2O$ consists of 0-5% $Li_2O$, 0-25% $Na_2O$, 0-25% $K_2O$, 0-25% $Rb_2O$, and 0-25% $Cs_2O$; 5-55% RO wherein RO consists of 0-20% MgO, 0-30% CaO, 0-45% SrO, and 0-55% BaO; 35-70% $SiO_2$; 0-20% $R_2O_3$ wherein $R_2O_3$ consists of 0-20% $La_2O_3$ and 0-15% $Y_2O_3$; 0.1-2% of at least on oxide selected from the group consisting of cerium oxide and europium oxide; 5-20% $Tb_2O_3$; and 1-15% $Gd_2O_3$.

In other embodiments of the invention, terbium oxide is present in an amount of about 6 to 12 percent, cerium and europium oxides are present in an amount of about 0.1 to 1.0 percent and gadolinium oxide is present in an amount of about 1 to 10 percent.

As discussed in U.S. Pat. No. 3,654,172 the particular choice of host material is influenced by a variety of considerations well known to those skilled in art as are the processes for making such terbium activated silicate glasses. Minor amounts of various additives such as $Al_2O_3$, $B_2O_3$, $P_2O_5$, $La_2O_3$ and $Y_2O_3$ are known to improve the working and chemical properties and chemical durability of such glasses.

Several examples are given to illustrate the preparation and characteristics of the luminescent glasses of the invention. These examples are to be construed as illustrative only and not limiting in any manner the scope and spirit of the invention as defined by the appended claims.

EXAMPLE 1

Various amounts of cerium oxide were incorporated into the compositions expressed in weight percent on the oxide basis listed in Table 1. $Ce_2O_3$ was substituted for BaO in this case and the small reduction in the latter does not have an effect on the luminescent properties of the glass. The batch constituents may comprise any materials, either the oxides or other compounds, which when melted together, are transformed to the desired composition in the proper portions. The batch components were blended together, placed in either fused silica, platinum, or aluminum oxide crucibles and then melted at 1400°-1500° C. for about 3 hours in air. The melts were poured onto a cool graphite plate to yield circular buttons approximately ⅜" thick. The buttons were transferred immediately to an annealing furnace operated at 850° C.

Although the glasses recorded in Table 1 in this invention were made in accordance with the laboratory procedure outlined above, it will be appreciated that where large quantities of glass are desired these compositions are amenable to conventional glass melting techniques in pots or continuous tanks. Likewise, these glasses can be shaped by commercial glass-forming techniques such as blowing, casting, drawing, pressing, rolling, etc. and can be formed into fiber-optic scintillating faceplates or ground up and applied to mylar supports as in the case of polycrystalline phosphors.

Table 1 demonstrates the effect of addition of cerium oxide on the luminescent properties of the glass. Cerium oxide reduces the afterglow in the glass measured here as percent signal increase during x-ray illumination at 250 kV machine energy. The measurements reported here were taken at the 10,000 R exposure level. Increasing amounts of cerium oxide further reduce this signal buildup. A further observation made with the cerium doped glasses was the reduced phosphorescence after the x-rays were turned off in relation to the cerium free glasses. For example, the phosphorescence is approximately 0.1 percent of peak signal at 0.5 seconds after the x-rays are turned off for sample 3 as opposed to 5 percent in a commercial cerium free glass.

The relative light output measurements of the glasses in Table 1 were measured immediately after x-rays were turned on, for example, before buildup. Prior to this test, the glasses had been thoroughly heated (450° C.) to release trapped energy and relieve radiation coloration. These measurements are an indication of their relative response prior to radiation damage. Although the cerium glasses have a reduced signal, they offer the substantial advantage of improved radiation damage resistance. For example, composition 2 and 3 offer a 15-18% reduction in afterglow at a cost of only 3-5% in luminescence responsivity.

TABLE 1

| Percent | 1 | 2 | 3 | 4 | 5 |
|---|---|---|---|---|---|
| $SiO_2$ | 54.2 | 54.2 | 54.2 | 54.2 | 54.2 |
| BaO | 29.5 | 29.3 | 29.0 | 28.5 | 27.5 |
| $Li_2O$ | 9.1 | 9.1 | 9.1 | 9.1 | 1.5 |
| $Al_2O_3$ | 4.2 | 4.2 | 4.2 | 4.2 | 4.2 |
| $Tb_2O_3$ | 3.0 | 3.0 | 3.0 | 3.0 | 3.0 |
| $Ce_2O_3$ |  | 0.2 | 0.5 | 1.0 | 2.0 |
| Relative Light Output | 100 | 97.2 | 95.3 | 91.6 | 89.5 |
| % Signal Inc. Under X-Rays | 20 | 5 | 2 | 1 | 0 |

TABLE 1-continued

| Percent | 1 | 2 | 3 | 4 | 5 |
|---|---|---|---|---|---|
| at 10kR | | | | | |

EXAMPLE 2

Table 2 compares the x-ray radiation stabilizing effects of europium oxide on a silicate luminescent glass composition. The compositions in this table were prepared in a similar manner to those in Table 1 except that they were melted at 1540° C. for about 3 hours in a vitreous carbon crucible under a flowing argon atmosphere. The glasses were not poured, but were cooled from the melt in the crucibles while in the furnace to 850° C. where they were held for 3 hours under the same argon atmosphere. The glasses were then cooled by natural cooling after the furnace was shut down to yield glass buttons approximately ⅜" thick.

Table 2 demonstrates that europium oxide additions quench the afterglow measured here as percent signal increase under continuous x-ray illumination of 250 kV machine energy at 3000R. The glass remains stable to 25,000R and above. This is a significant result in that europium oxide addition does not diminish the luminescence signal of the glass. The visual phosphorescence after the x-rays are turned off is reduced in the europium-containing glass in comparison to the europium-free glass in a similar manner to that observed with cerium glasses (see Example 1).

TABLE 2

| Percent | 1 | 2 |
|---|---|---|
| $SiO_2$ | 56.1 | 55.1 |
| BaO | 12.4 | 12.2 |
| $Cs_2O$ | 12.4 | 12.2 |
| $Al_2O_3$ | 1.5 | 1.5 |
| $Ba_2O$ | 2.8 | 2.8 |
| $K_2O$ | 1.3 | 1.3 |
| $La_2O_3$ | 4.5 | 4.4 |
| $EuO/Eu_2O_3$ | | 1.1 |
| $Tb_2O_3$ | 9.0 | 9.0 |
| Relative Light Output | 100 | 100 |
| % Signal Inc. Under X-Rays | | |
| At 3000 R | 3.1 | 0 |
| At 25000 R | 7.0 | 0 |

EXAMPLE 3

Both compositions in Table 3 were prepared in a similar manner to those compositions in Table 2. Table 3 demonstrates that gadolinium oxide can be added to luminescent glasses to incorporate larger amounts of the luminescent activator $Tb_2O_3$ without the effects of concentration quenching. Composition 1 is similar to one in U.S. Pat. No. 3,654,172 and has a high x-ray induced luminescence. In this invention, the incorporation of gadolinium oxide and the concomitant increase in $Tb_2O_3$ over that claimed in U.S. Pat. No. 3,654,172 result in a signal improvement of 38%. Minor differences in the other oxide components would not be responsible for the signal increase.

TABLE 3

| Percent | 1 | 2 |
|---|---|---|
| $SiO_2$ | 55.8 | 55.8 |
| BaO | | 12.3 |
| SrO | 20.8 | |

TABLE 3-continued

| Percent | 1 | 2 |
|---|---|---|
| $Cs_2O$ | 12.3 | 12.3 |
| $Al_2O_3$ | 1.5 | 1.5 |
| $Na_2O$ | 2.8 | 2.8 |
| $Li_2O$ | 1.3 | |
| $K_2O$ | | 1.3 |
| $Gd_2O_3$ | | 5.0 |
| $Tb_2O_3$ | 5.4 | 9.0 |
| Relative Light Output | 62 | 100 |

EXAMPLE 4

The compositions of Table 4 were prepared in a similar manner of those of Example 2. The afterglow and light output measurements were taken as in Examples 2 and 3 at 250 kV machine energy. Table 4 demonstrates that $Ce_2O_3$ addition reduces afterglow and signal buildup (Compositions 2-6); that $Gd_2O_3$ addition allows for an increase in $Tb_2O_3$ concentration above the ranges claimed in U.S. Pat. No. 3,654,172 with a concomitant increase in luminescent response (Compositions 3-6) over one of the best glasses in that patent (Composition 1), and that compositions that have $Ce_2O_3$, $Gd_2O_3$ and $Tb_2O_3$ additions in the appropriate amounts (Compositions 3-6) have an improved luminescent response and an improved radiation damage stability over prior art. Table 4 also demonstrates the effect of concentration quenching. Here, the peak light output is at 10.5 wt % $Tb_2O_3$. (This peak value is not dramatically altered with different concentrations of $Gd_2O_3$. It has been shown in other compositions that the $Gd_2O_3$ concentration can range between 1-15% to obtain similar results.)

TABLE 4

| Percent | 1 | 2 | 3 | 4 | 5 | 6 |
|---|---|---|---|---|---|---|
| $SiO_2$ | 55.8 | 55.0 | 55.0 | 54.3 | 53.2 | 52.3 |
| BaO | | 12.3 | 11.9 | 11.7 | 11.4 | |
| SrO | 20.8 | 20.8 | | | | |
| $Cs_2O$ | 12.3 | 12.3 | 12.3 | 11.9 | 11.7 | 11.3 |
| $Al_2O_3$ | 1.5 | 1.5 | 1.5 | 1.5 | 1.4 | 1.4 |
| $Na_2O$ | 2.8 | 2.8 | 2.8 | 2.8 | 2.7 | 2.6 |
| $Li_2O$ | 1.3 | 1.3 | | | | |
| $K_2O$ | | | 1.2 | 1.3 | 1.3 | 1.3 |
| $Gd_2O_3$ | | | 4.9 | 5.0 | 4.9 | 4.8 |
| $Ce_2O_3$ | | 0.8 | 0.8 | 0.8 | 0.8 | 0.8 |
| $Tb_2O_3$ | 5.4 | 5.4 | 9.0 | 10.5 | 12.3 | 14.2 |
| Relative Light Output | 67 | 63 | 87 | 100 | 94 | 84 |
| % Signal Inc. at 25000 R | 17 | 6 | 0 | 0 | 0 | 0 |

While there has been shown and described what are at present considered the preferred embodiments of the invention, it will be obvious to those skilled in the art that various changes and modifications may be made therein without departing from the scope of the invention as defined by the appended claims.

The new glass compositions listed in Examples 1-4 are not meant for use only for radiography or the detection of x-rays. They can be used for other applications such as particle beam tracking, detection of electron beams in cathode ray tubes or electron microscopes, as ground glass phosphor in fluorescent lighting, and in the detection of thermal neutrons, or gamma-rays.

These glasses can be formed or shaped into faceplates, fiber optic faceplates consisting of bundles of core glass, each surrounded by a cladding glass, lenses or can be ground and mixed with binder and deposited on a support such as mylar. Furthermore, to increase luminescence in the forward, camera viewing direction, an aluminum layer on the order of a few microns thick can be deposited to the opposite side of the structure to reflect light toward the camera.

What is claimed is:

1. A method of converting x-ray radiation into radiation in the visible spectrum comprising the steps of:
   a. positioning in said x-ray radiation field a luminescent terbium-activated, silicate glass exhibiting strong visible luminescence, low phosphorescence and low background buildup when exposed to x-ray radiation in the range of 5 KeV to 16 MeV and consisting essentially, by weight on the oxide basis, of about 3–25% $R_2O$ wherein $R_2O$ consists of 0–5% $Li_2O$, 0–25% $Na_2O$, 0–25% $K_2O$, 0–25% $Rb_2O$, and 0–25% $Cs_2O$; 5–55% RO wherein RO consists of 0–20% MgO, 0–30% CaO, 0–45% SrO and 0–55% BaO; 35–70% $SiO_2$; 0–20% $R_2O_3$ wherein $R_2O_3$ consists of 0–20% $La_2O_3$ and 0–15% $Y_2O_3$; 0.1–2% of at least one oxide selected from the group consisting of cerium oxide and europium oxide; 5–20% $Tb_2O_3$; and 1–15% $Gd_2O_3$; and
   b. irradiating said glass with said x-ray radiation, thereby to convert said x-ray radiation into said visible radiation.

2. A method in accordance with claim 1 wherein said terbium oxide is present in an amount of about 6 to 12 percent.

3. A method in accordance with claim 1 wherein said at least one oxide of cerium and europium is present in an amount of about 0.1 to 1.0 percent.

4. A method in accordance with claim 1 wherein said gadolinium oxide is present in an amount of about 1 to 10 percent.

* * * * *